US012078014B2

(12) United States Patent
Garayev et al.

(10) Patent No.: US 12,078,014 B2
(45) Date of Patent: Sep. 3, 2024

(54) STOWABLE STEP ASSEMBLY

(71) Applicant: Purdue Research Foundation, West Lafayette, IN (US)

(72) Inventors: Elvin Garayev, Aurora, IL (US); Andrew James Bowman, Bellbrook, OH (US); Dalton Garrett, Odessa, FL (US); William Andrew Yount, Tampa, FL (US)

(73) Assignee: Purdue Research Foundation, West Lafayette, IN (US)

( * ) Notice: Subject to any disclaimer, the term of this patent is extended or adjusted under 35 U.S.C. 154(b) by 402 days.

(21) Appl. No.: 16/987,208

(22) Filed: Aug. 6, 2020

(65) Prior Publication Data

US 2021/0040795 A1 Feb. 11, 2021

Related U.S. Application Data

(60) Provisional application No. 62/884,620, filed on Aug. 8, 2019.

(51) Int. Cl.

| | |
|---|---|
| ***E06C 1/00*** | (2006.01) |
| ***A47C 21/00*** | (2006.01) |
| ***E06C 7/08*** | (2006.01) |
| ***E06C 9/06*** | (2006.01) |

(52) U.S. Cl.

CPC .............. *E06C 1/005* (2013.01); *A47C 21/00* (2013.01); *E06C 7/08* (2013.01); *E06C 9/06* (2013.01)

(58) Field of Classification Search

CPC . E06C 1/005; E06C 1/387; E06C 7/08; E06C 7/083; E06C 9/06; E06C 9/04; A47C 21/00; A47C 19/20; A47C 19/021; A47C 19/028

See application file for complete search history.

(56) References Cited

U.S. PATENT DOCUMENTS

| | | | | | |
|---|---|---|---|---|---|
| 770,205 | A * | 9/1904 | Warren | E06C 9/04 | 182/92 |
| 865,375 | A * | 9/1907 | Frye | B60R 3/02 | 182/91 |
| 1,419,563 | A * | 6/1922 | Horning | E06C 9/04 | 248/222.51 |
| 1,953,298 | A * | 4/1934 | Goodwin | B61D 23/02 | 280/166 |

(Continued)

*Primary Examiner* — Jessica L Laux
*Assistant Examiner* — Kathleen M. McFarland
(74) *Attorney, Agent, or Firm* — Piroozi-IP, LLC

(57) ABSTRACT

A stowable step assembly for climbing a structure is disclosed which includes an articulating step, including a step, the step has at least one cam surface, allowing articulation of the step from i) a deployed position allowing a user to place weight on the step, to ii) a stowed position, at least one cam stop configured to stop the cam motion of the step when in the deployed position; a hanger, including a connector configured to interface with the step, wherein the connector includes at least one counterpart cam surface to the at least one cam surface of the step and wherein the connector includes at least one counterpart cam stop to the at least one cam stop of the step, at least one hook configured to interface with a counterpart attachment arrangement of a structure; and a fastener configured to couple the connector to the step.

7 Claims, 7 Drawing Sheets

(56) References Cited

U.S. PATENT DOCUMENTS

| | | | | |
|---|---|---|---|---|
| 2,031,615 | A * | 2/1936 | McKinney | E06C 9/04 52/24 |
| 2,425,927 | A * | 8/1947 | Elrad | F16B 12/60 5/292 |
| 2,745,703 | A * | 5/1956 | Rose | E21B 19/10 182/189 |
| 3,008,534 | A | 11/1961 | Canon | |
| 3,891,261 | A | 6/1975 | Finneman | |
| 3,986,503 | A | 11/1976 | Le Guillon | |
| 4,402,385 | A * | 9/1983 | Buche | E06C 9/04 182/91 |
| 4,462,486 | A * | 7/1984 | Dignan | B60R 3/02 280/166 |
| 4,697,669 | A * | 10/1987 | Bergsten | E06C 9/04 182/189 |
| 5,941,485 | A * | 8/1999 | Davidson | E04H 12/08 411/340 |
| D445,076 | S * | 7/2001 | Weinerman | D12/203 |
| 6,471,002 | B1 * | 10/2002 | Weinerman | B60R 3/02 280/166 |
| 6,484,981 | B1 * | 11/2002 | Perrault | E06C 9/04 248/222.51 |
| 6,484,982 | B1 * | 11/2002 | Barry | E06C 9/04 248/220.21 |
| 6,491,272 | B1 * | 12/2002 | Franks | E06C 9/04 248/231.9 |
| 7,066,298 | B1 * | 6/2006 | Mackinnon | A47B 96/061 182/92 |
| 7,976,042 | B2 * | 7/2011 | Watson | B60R 3/02 280/166 |
| 9,695,035 | B2 * | 7/2017 | Dejong | B68C 3/0016 |
| 9,782,626 | B2 * | 10/2017 | Wakefield, Jr. | A63B 27/02 |
| 9,975,621 | B2 * | 5/2018 | Rechert | E06C 1/005 |
| 10,112,078 | B1 * | 10/2018 | Sailer | A63B 27/00 |
| D862,340 | S * | 10/2019 | Le | D12/203 |
| 10,780,300 | B2 * | 9/2020 | Warren | E06C 7/18 |
| 10,954,717 | B2 * | 3/2021 | Sailer | E06C 7/18 |
| 11,060,354 | B2 * | 7/2021 | Reid | E06C 1/381 |
| 11,332,901 | B1 * | 5/2022 | Eckerman | E06C 9/04 |
| 2002/0104939 | A1 * | 8/2002 | Perrault | E06C 7/081 248/218.4 |
| 2010/0101020 | A1 | 4/2010 | Bisinger et al. | |
| 2015/0196806 | A1 * | 7/2015 | Wakefield, Jr. | E06C 9/04 182/187 |
| 2016/0096045 | A1 * | 4/2016 | Sailer | E06C 7/18 411/366.1 |
| 2016/0096046 | A1 * | 4/2016 | Sailer | A62B 35/0068 411/366.1 |
| 2016/0288898 | A1 * | 10/2016 | Rechert | E06C 1/005 |
| 2016/0375282 | A1 * | 12/2016 | Sailer | E06C 7/18 182/90 |
| 2018/0133526 | A1 * | 5/2018 | Warren | E06C 7/18 |
| 2019/0024455 | A1 * | 1/2019 | Reid | A47K 17/00 |
| 2019/0136539 | A1 * | 5/2019 | Davis | E04F 11/0223 |
| 2020/0048964 | A1 * | 2/2020 | Sailer | E06C 7/18 |
| 2020/0080327 | A1 * | 3/2020 | Burrow | A63B 27/00 |
| 2021/0040795 | A1 * | 2/2021 | Garayev | E06C 9/04 |
| 2021/0277717 | A1 * | 9/2021 | Morris | E06C 7/50 |
| 2022/0074267 | A1 * | 3/2022 | Albertyn | E06C 1/34 |

* cited by examiner

STOWABLE STEP ASSEMBLY

CROSS REFERENCE TO RELATED APPLICATIONS

The present patent application is related to and claims the priority benefit of U.S. Provisional Patent Application having Ser. No. 62/884,620, having the title "STOWABLE STEP ASSEMBLY" filed Aug. 8, 2019, the contents of which are hereby incorporated by reference in its entirety into the present disclosure.

TECHNICAL FIELD

The present disclosure generally relates to assemblies that allow an individual to climb a structure, and in particular, to a height selective assembly that can provide a step with an attachment arrangement for climbing various structures equipped with a matching attachment arrangement.

BACKGROUND

This section introduces aspects that may help facilitate a better understanding of the disclosure. Accordingly, these statements are to be read in this light and are not to be understood as admissions about what is or is not prior art.

A common challenge for climbing a structure with fixed climbing means (e.g., ladders) is height adjustability for individuals of various stature. In addition, such climbing means are often bulky and can get in the way, particularly in close quarters (e.g., a small dormitory room with loft-style beds).

Referring to FIGS. 6 and 7, examples of how solutions found in the prior art for such climbing means. For example, FIG. 7 shows a ladder structure between a lower bed and an upper bed. However, such a ladder is clearly in the way of egress and ingress for an individual seeking to use the lower bed. In addition, the ladder is fixed, and thus by definition cannot accommodate individuals of various stature. For example, a person who is tall may not feel comfortable in finding the right height as the first step, or more problematic as the next step. The lack of adjustability leads to significant challenges. In addition, the lack of stowability of the climbing means further complicates the use of such climbing means.

Therefore, there is an unmet need for a novel climbing arrangement for a structure that can be adjustable, and stowable, particularly, for tight quarters.

SUMMARY

A stowable step assembly for climbing a structure, is disclosed. The stowable step assembly includes an articulating step. The articulating step includes a step configured to allow a user to place weight in an upward or downward climbing motion. The step has at least one cam surface, allowing articulation of the step from i) a deployed position allowing a user to place weight on the step, to ii) a stowed position allowing the step to be stowed away when not in use, and at least one cam stop configured to stop the cam motion of the step when in the deployed position. The stowable step assembly also includes a hanger assembly. The hanger assembly includes a connector configured to interface with the step, wherein the connector includes at least one counterpart cam surface adapted to interface with the at least one cam surface of the step and wherein the connector includes at least one counterpart cam stop adapted to interface with the at least one cam stop of the step. The hanger assembly further includes at least one hook configured to interface with a counterpart attachment arrangement of a structure. The stowable step assembly further includes a fastener configured to couple the connector to the step.

A method of climbing a structure is also disclosed. The method includes coupling a stowable step assembly with a structure. an articulating step. The articulating step includes a step configured to allow a user to place weight in an upward or downward climbing motion. The step has at least one cam surface, allowing articulation of the step from i) a deployed position allowing a user to place weight on the step, to ii) a stowed position allowing the step to be stowed away when not in use, and at least one cam stop configured to stop the cam motion of the step when in the deployed position. The stowable step assembly also includes a hanger assembly. The hanger assembly includes a connector configured to interface with the step, wherein the connector includes at least one counterpart cam surface adapted to interface with the at least one cam surface of the step and wherein the connector includes at least one counterpart cam stop adapted to interface with the at least one cam stop of the step. The hanger assembly further includes at least one hook configured to interface with a counterpart attachment arrangement of a structure. The stowable step assembly further includes a fastener configured to couple the connector to the step. The step of coupling the stowable step assembly with the structure includes interfacing the at least one hook with the counterpart attachment arrangement. The method also includes placing the step in the deployed position. Furthermore, the method includes climbing by stepping onto the step.

DETAILED DESCRIPTION

Figure 1:
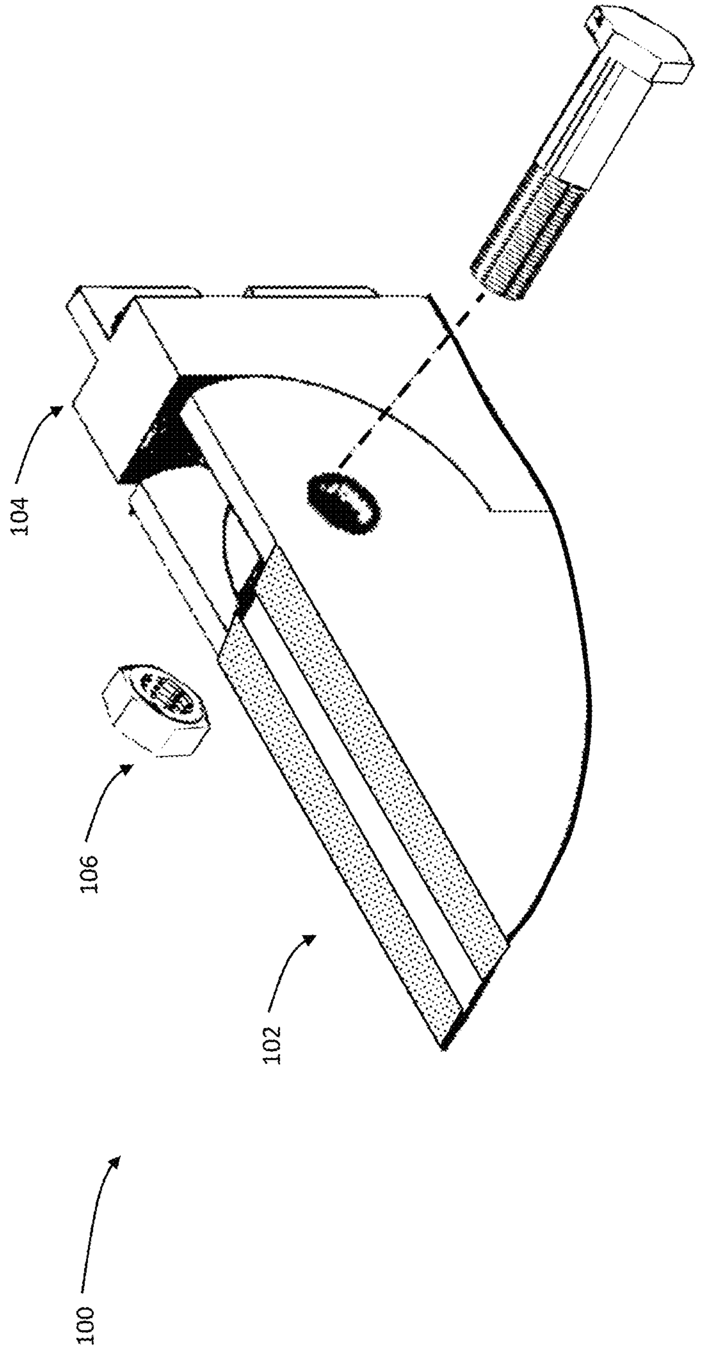
FIG. 1 is a perspective view of a stowable step assembly, according to the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

Referring to FIG. 1 is a perspective view of a stowable step assembly 100, according to the present disclosure. The stow step assembly is configured to hang from a counterpart hanging arrangement, as described below. Once attached to the counterpart hanging arrangement at a desired height selectable for a user's particular stature (i.e., height), the user can climb the stowable step assembly 100 either as a single stowable step assembly 100, or alternatively, with more than one stowable step assembly 100. These stowable step assemblies 100 can also be used by a user allowing the user to pick up one stow step assembly that has been used by the user to be placed above in an upward climb or placed down in a downward climb when such a climb requires more than two such stow step assemblies.

Figure 4C:
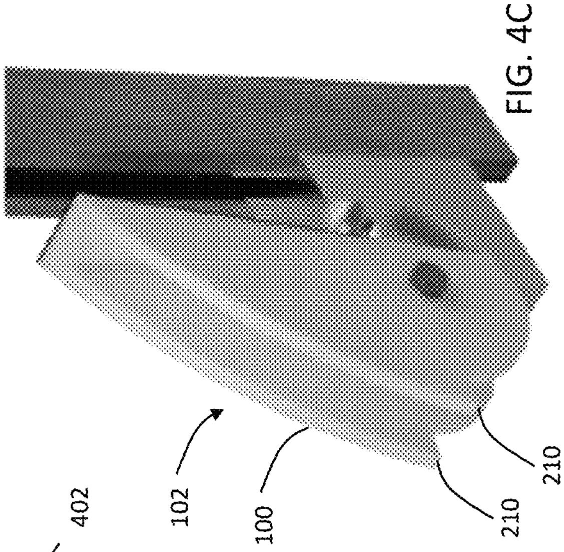
FIGS. 4A, 4B, and 4C are a perspective view, a plan view, and another perspective of the stowable step assembly coupled to a frame of a structure, respectively.

The stowable step assembly 100 shown In FIG. 1, includes three major components: 1) an articulating step 102; 2) a hanger assembly 104, and 3) a fastener set. These three main components couple to each other to make a compact assembly 100 that can be used for climbing a structure, e.g., a bed post, e.g., on a bunkbed. The articulating step 102, as further described has a cam surface that meets a counterpart cam surface on the hanger assembly 104. These two components (i.e., the articulating step 102 and the hanger assembly 104) are coupled to each other by the fastener set 106. Once coupled, the articulating step 102 can articulate with respect to the hanger assembly 104 along the counterpart cam surfaces, until reaching a cam stop, as discussed more fully below. The hanger assembly 104 is configured to be hung from a counterpart hanging arrangement on a structure, e.g., a bed frame. Thus, while the hanger assembly 104 is maintained in a stationary position, the articulating step assembly 102 is adapted to articulate about the fastener set 106 and along the counterpart cam surfaces along a first direction until reaching cam stops in a deployed position, as shown in FIG. 1 and as discussed further below. However, the articulating step assembly 102 is further adapted to articulate along a second direction, opposite the first direction, along the counterpart cam surfaces until reaching a stowed position, as shown in FIG. 4C, and as discussed further below.

Figure 2:
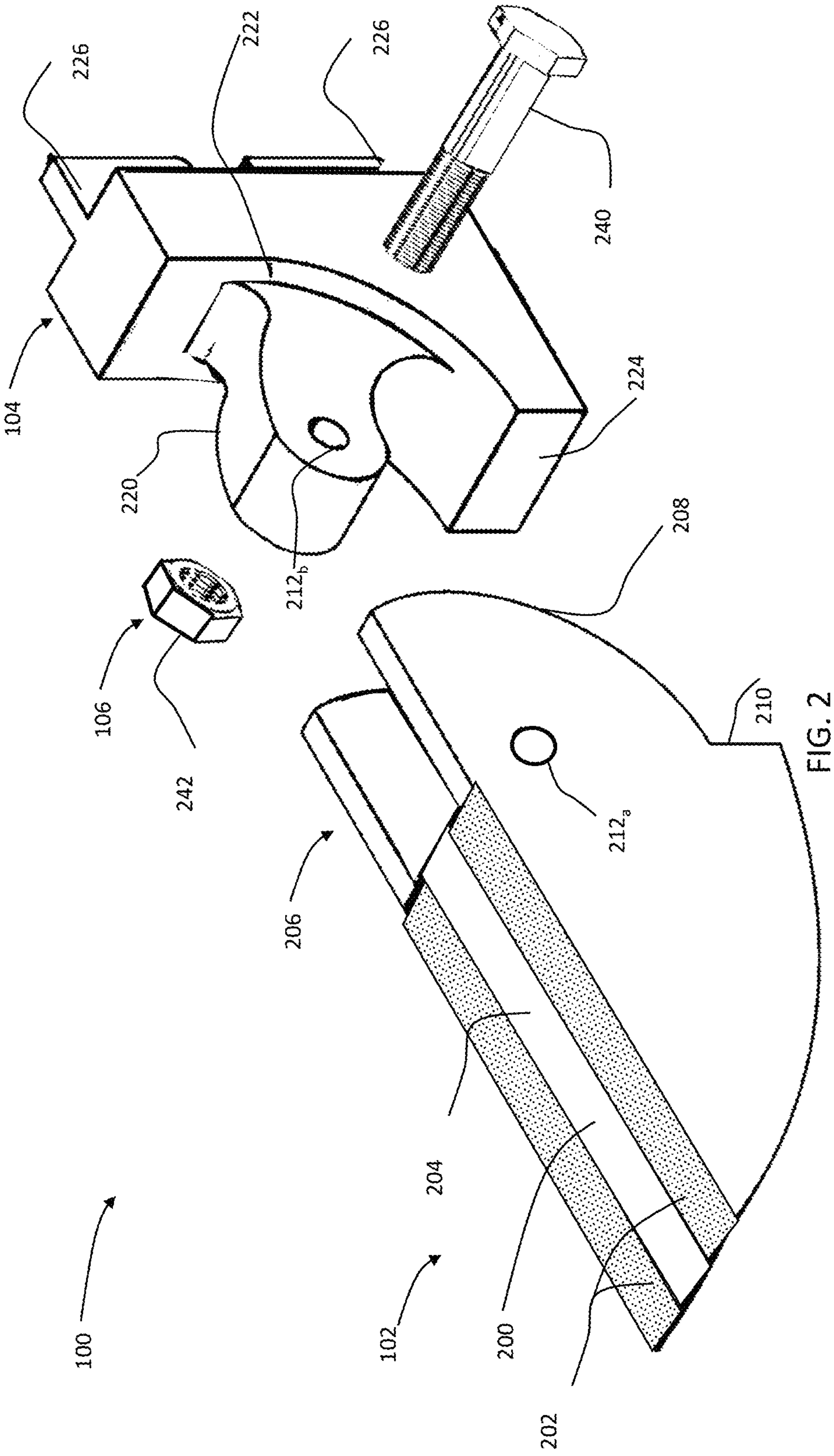
FIG. 2 is an exploded perspective view of the stowable step assembly of FIG. 1, including an articulating step assembly and a hanger assembly.

Referring to FIG. 2, the stowable step assembly 100 is shown in an exploded perspective view. As discussed above, the stowable step assembly 100 includes three main components. The first is the articulating step assembly 102. The articulating step assembly 102 includes a flat surface identified as the step 200. The step 200 includes two strips identified as grip strips 202 that allow a high coefficient of friction (e.g., at least 0.3). The area between the grip strips can be used to provide a fluorescent strip 204 made of material that fluoresces in the dark. The articulating step also includes cams 206. The end of the articulating step assembly 102 that includes the cams 206 is hollowed in the middle, thereby the end constitutes two cams 206. The cams 206 include cam surfaces 208. Each of the cam surfaces 208 allows the articulating step assembly 102 to articulate from i) a deployed position (see FIG. 4A, discussed below) to ii) a stowed position (see FIG. 4C, discussed below). Each of the cam surfaces 208 ends at a cam stop 210 which allows the articulation to stop from a cam-like movement to a position of the articulating step that is substantially perpendicular to a counterpart attachment arrangement discussed below. The articulating step assembly also includes matching fastener holes 212$_a$ (there are two but only one is shown in FIG. 2) that allow coupling of the articulating step assembly 102 to the hanger assembly 104 and allow articulation thereby.

Figure 4B:
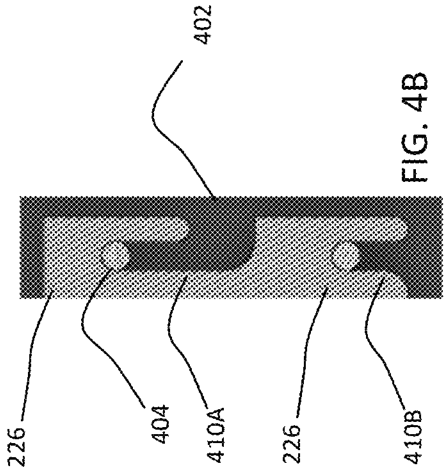

The hanger assembly 104 includes a connector that is shaped and configured to couple to the cams 206 of the articulating step assembly 102. The connector 220 may be solid with a through-hole fastener 212$_b$ interface or hollow with matching fastener interface holes. The hanger assembly further includes cam surfaces 222 (one on either side of the connector 220) and a cam stop 224 matching the cam stops 210 of the articulating step assembly. The hanger assembly 104 also includes at least one hook 226 that is configured to interface with a matching counterpart attachment mechanism and to be attached thereto in a secured fashion. The hook(s) 226 are intended to go around one or two rods or other attachment mechanisms as shown in FIG. 4B, discussed below.

According to one embodiment, the fastener set 106 is a bolt 240 that passes through the fastener holes 212$_a$ and fastener hole 212*b* of the articulating step assembly 102 and the hanger assembly 104, respectively, and a nut 242 that is used to tighten the bolt 240 and secure the fastener set 106 to the articulating step assembly 102 and the hanger assembly 104. While a bolt 240 and a nut 242 are shown, a plurality of other fastening arrangement known to a person having ordinary skill in the art, e.g., rivet, are also possible.

Figure 3B:
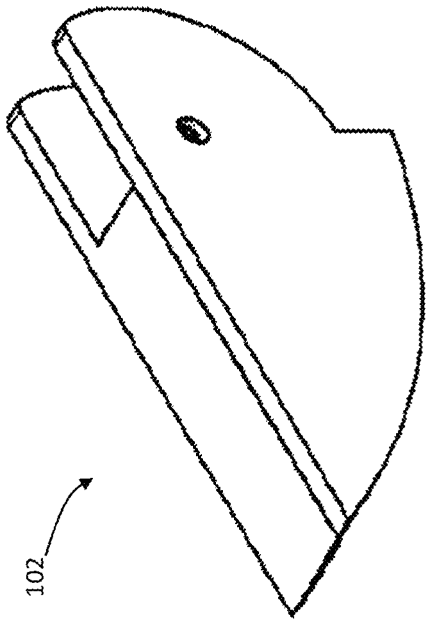
FIGS. 3A and 3B are perspective views of the hanger assembly and the articulating step assembly of FIG. 2, respectively.
Figure 3A:
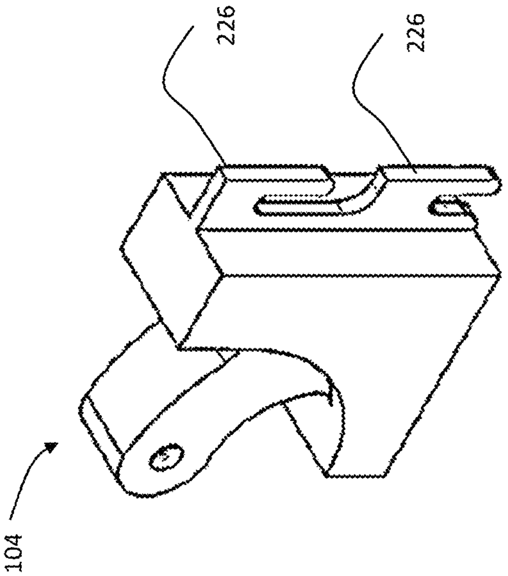

The hanger assembly 104 and the articulating step assembly 102 are further shown in FIGS. 3A and 3B in perspective views, respectively. The hooks 226 are more clearly shown in FIG. 3*a*. For added strength, the hooks 226 may be doubled (not shown).

Figure 4A:
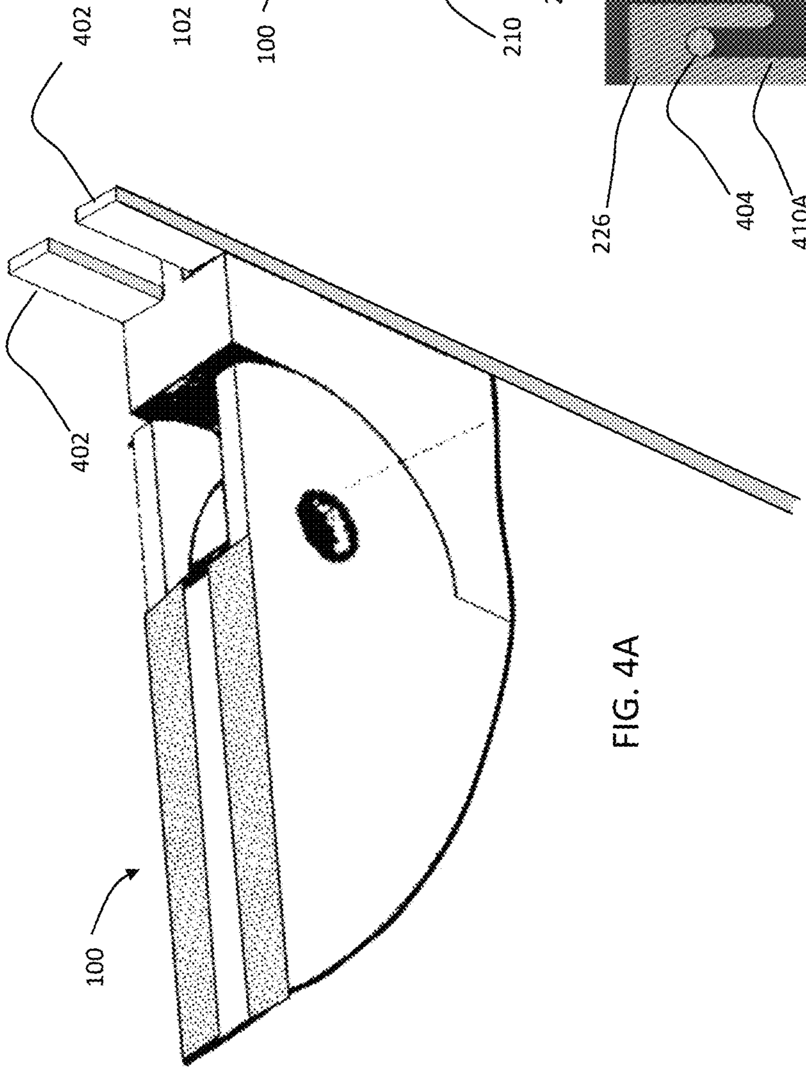

Referring to FIG. 4A, the stowable step assembly 100 is shown attached to a frame 402 of a structure, e.g., a bed in the deployed position. The back surface of the hanger assembly 104 and its hooks 226 are adapted to securely attach to the frame 402, preventing the hooks 226 of the hanger to dislodge from the counterpart attachment arrangement (e.g., rods 404 disposed in the frame 402, as shown in FIG. 4B which is a plan view of the hanger assembly 402 engaged with rods 404 and frame 402). The two hooks 226 each include hook cam surfaces 410A and 410B configured to interface with the counterpart attachment arrangement (e.g., rods 404 disposed in the frame 402), wherein the two hook cam surfaces 410A and 410B enhance ease of positioning of the two hooks 226 on the counterpart attachment arrangement of the structure. The hanger assembly 104 can only be dislodged by an upward movement in order to free the hooks 226 from the counterpart attachment arrangement (e.g., rods 404). FIG. 4C is a photograph which shows the stowable step assembly 100 with the articulating step assembly 102 in the stowed position by simply rotating the step 200 including two cam stops 210. Alternatively, the step 200 can be spring-loaded to articulate it towards the stowed position whereby only by placing the weight of the user on the step 200 will the bias of the biasing member be overcome to allow the step to articulate from the stowed position to the deployed position (see FIG. 4A). However, when the weight is removed, in this embodiment, the step 200 automatically returns to the stowed positioned under the bias of the biasing member.

Figure 5:
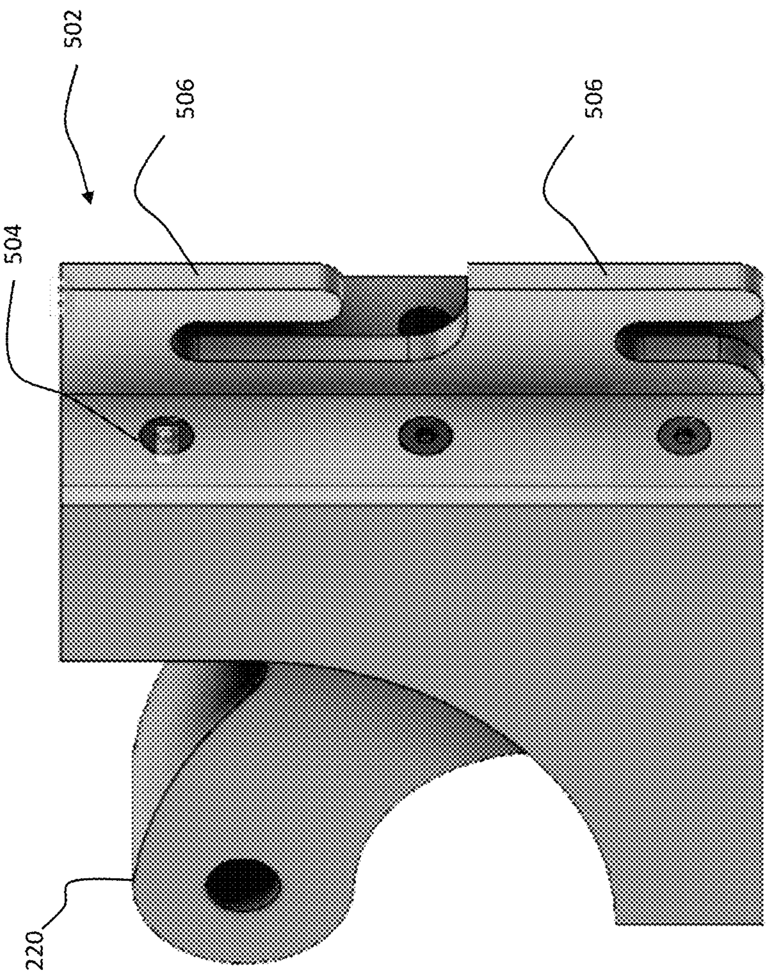
FIG. 5 is a perspective view of the hanger assembly, according to another embodiment.
Figure 6:
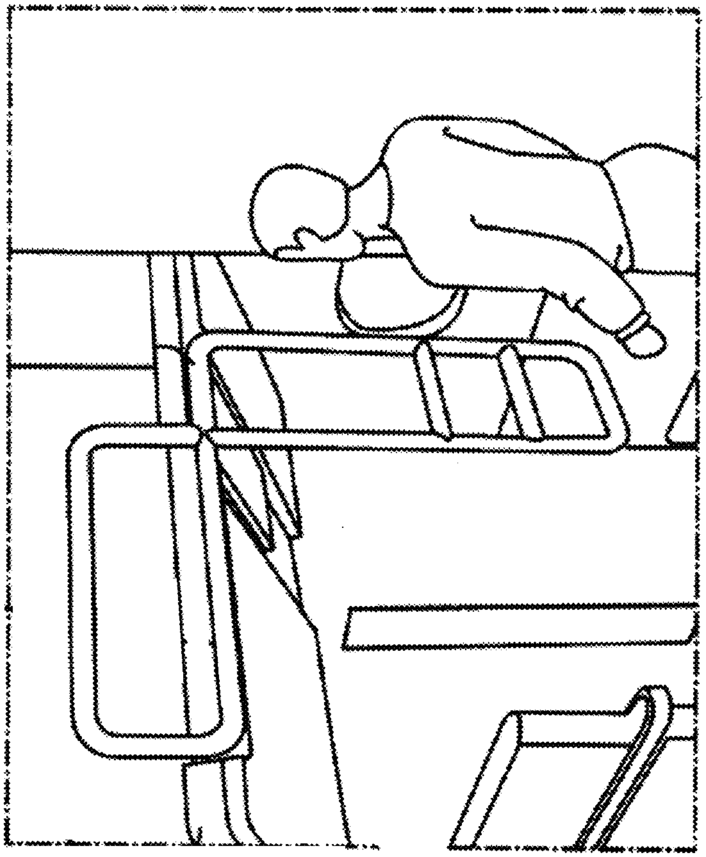
FIG. 6 (Prior Art)
FIGS. 6 and 7 schematics of prior art approaches to arrangements for climbing a structure, e.g., a bed.
Figure 7:
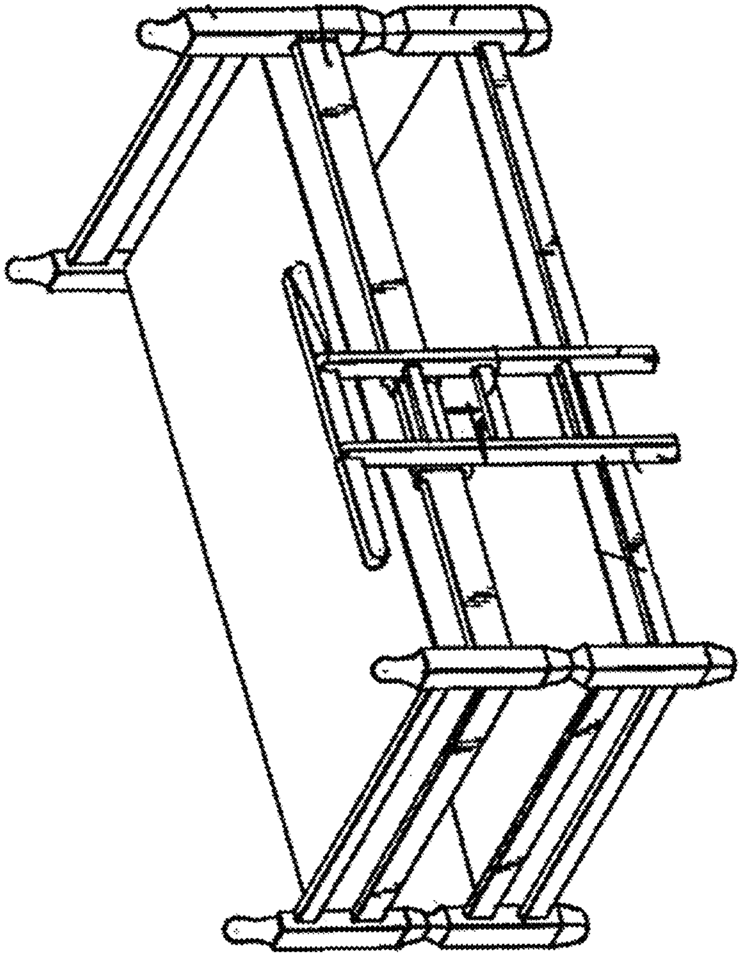
FIG. 7 (Prior Art)

FIG. 5 shows a perspective view of one embodiment of the hanger assembly 502 where a backplate with hooks 406 is attached to a modified version of the connector 220. This will allow serviceability of this modified version of the connector without having to discard the back plate portion containing the hooks.

The stow step assembly is configured to allow a user with a nominal weight of about 300 lbs to climb a structure.

According to one embodiment of the present disclosure, the connector 220 (see FIG. 2) can be hallowed out for reduction of weight.

According to one embodiment of the present disclosure, the connector (see FIG. 2) can be metallic, e.g., aluminum.

According to one embodiment of the present disclosure, the step 200 (see FIG. 2) can be made from plastic material, e.g., high-density polyethylene or acrylonitrile butadiene styrene.

According to one embodiment of the present disclosure, the step 200 (see FIG. 2) includes a strap (not shown) that can be used by a user to lift the stow step assembly out of engagement with the counter attachment arrangement in order to use the stow step assembly as the user continues to climb upward or downward from a height. In this embodiment, the user may remove a first stowable step assembly from a structure desired to be climbed, while placing weight on a second stowable step assembly of the plurality, and then coupling the first stowable step assembly with the structure. When doing this, the distance of the first stowable step assembly from the second stowable step assembly is between 12 to 18 inches.

According to one embodiment of the present disclosure, the step 200 (see FIG. 2) includes a strap that interfaces with a user's shoe, thereby allowing the user to climb a substantial height.

According to one embodiment of the present disclosure, the fastener set 106 (see FIG. 2) is a pin.

According to one embodiment, the structure to be climbed is a bed.

According to one embodiment, the structure to be climbed is a pole.

According to one embodiment, the structure to be climbed is a wall.

Those having ordinary skill in the art will recognize that numerous modifications can be made to the specific implementations described above. The implementations should not be limited to the particular limitations described. Other implementations may be possible.

The invention claimed is:

1. A stowable step assembly for climbing a vertical structure, comprising:

an articulating step assembly, including a step configured to be coupled to a vertical structure and further configured to allow a user to place weight in an upward or downward climbing motion by placing the user's weight on an inward surface of the step while climbing the vertical structure, the step having a proximal end and a distal end opposite the proximal end, two cam surfaces disposed adjacent the proximal end, one said cam surface defining the proximal end of the step and another said cam surface coupled to the vertical structure, allowing articulation from i) a deployed position allowing a user to place weight on the step, to ii) a stowed position allowing the step to be stowed away when not in use where in the stowed position the step and the vertical structure assume a tucked formation such that extension of an imaginary line along said inward surface of the step is configured to cross an imaginary line along surface of the vertical structure adjacent the distal end of the step in an acute angle, two cam stops configured to stop the cam motion of the step when in the deployed position;

a hanger assembly, including a connector configured to interface with the step on one side of the connector, wherein the connector includes two counterpart cam surfaces to the two cam surfaces of the step and wherein the connector includes at least one counterpart cam stop to the two cam stops of the step, two hooks fixedly disposed on a second side of the connector, wherein the second side is opposite the first side of the connector, each of the two hooks having a hook cam surface configured to interface with one of a plurality of counterpart attachment arrangement of the vertical structure, wherein the two hook cam surfaces enhance ease of positioning of the two hooks on the counterpart attachment arrangement of the vertical structure; and a fastener configured to couple the connector to the step.

2. The stowable step assembly of claim 1, the connector is metallic.

3. The stowable step assembly of claim 2, the metal is aluminum.

4. The stowable step assembly of claim 1, the step includes plastics.

5. The stowable step assembly of claim 4, plastics includes one or more of high-density polyethylene and acrylonitrile butadiene styrene.

6. The stowable step assembly of claim 1, the at least one cam stop of the connector includes two cam stops.

7. The stowable step assembly of claim 1, the step is spring-loaded to bias the step to the stowed position.

* * * * *